July 16, 1929.  J. J. FAGAN  1,721,012

THERMOSTAT

Filed Jan. 3, 1928

INVENTOR
BY  John J. Fagan.
ATTORNEY

Patented July 16, 1929.

1,721,012

UNITED STATES PATENT OFFICE.

JOHN J. FAGAN, OF BAYONNE, NEW JERSEY.

THERMOSTAT.

Application filed January 3, 1928. Serial No. 244,315.

The invention relates to improvements in a thermostat in which a deflecting element, made of two strips of dissimilar metal, changes in form when the surrounding temperature changes, and this deflecting element, which is the intermediate element of two open electric circuits, closes each of said circuits, alternately, when acted upon by a higher or a lower temperature, and the objects of the invention are, first, to provide means of operating apparatus thermostatically with relatively high electric potential and current without the aid of stepping up relays or other intermediate mechanisms; second, to provide means of preventing the closing of the two said electric circuits when extreme deflections of the said deflecting element occur; and, third, to provide means of assembling with the thermostat, manual control-switches for controlling the apparatus which the thermostat automatically controls, and other apparatus which works in conjunction with the thermostatically controlled apparatus.

Figures 1, 2:
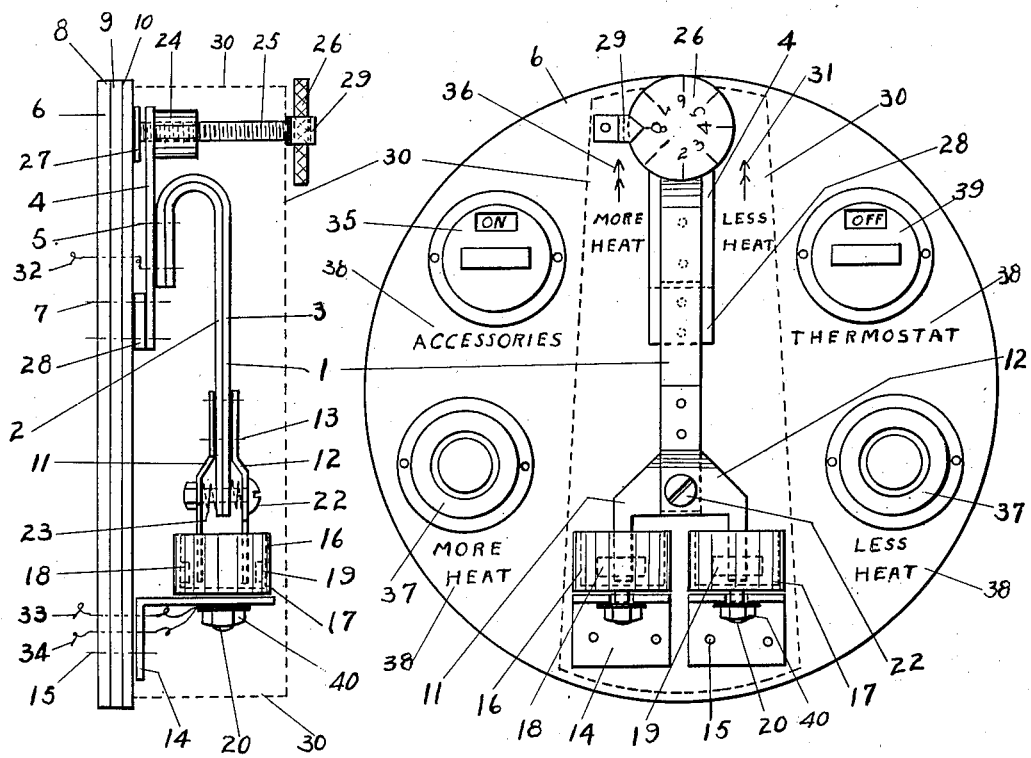
Figure 3:
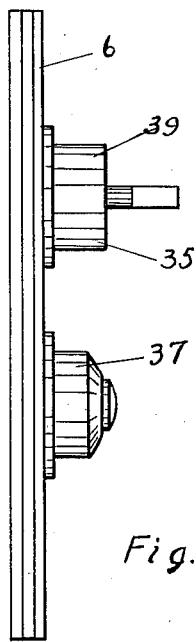
Figure 4:
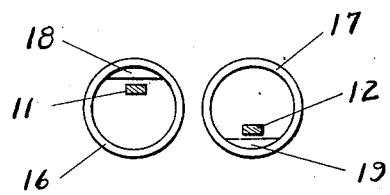

One form of the invention is illustrated in the accompanying drawings, in which Figure 1 is an end elevation of the thermostat base, the deflecting element, its supporter, its adjuster, its contact-tails, and oil cups which form, or hold the other two contacts of the double electric circuit; Figure 2, is a front elevation of the thermostat and the switches used for manual control; Figure 3, is an end elevation of the thermostatic base and switches used for manual control; Figure 4, is a plan of the oil cups and a section of the contact-tails.

Referring to Figures 1 and 2, the deflecting element, 1, which is made of two thin strips of dissimilar metals, 2 and 3, is fastened to the support-plate, 4, by rivets, 5. The support-plate, 4, is fastened to the base, 6, by bolts or rivets, 7. The base, 6, is made of three pieces, 8, 9, and 10, with the aim of lessening distortion of itself and the thermostat mountings when the elements, or the extreme temperatures tend to affect the adjustment of the thermostat. On the lower end of element 1 there are two contact tails, 11 and 12, which are fastened to it by rivets, 13; these contact tails are set out of alignment with the axis of element 1 in two directions for the purposes of adjustment and to prevent double contact, at the same time, with the other elements of the double electric circuit in which it is located. Supporting brackets, 14, are secured to the base, 6, with bolts or rivets, 15, these brackets support the cups, 16 and 17, which carry oil and the contacts, 18 and 19. The cups 16 and 17 have studs, 20, projecting from their bottoms and are held in place by nuts, 40. The cups, 16 and 17, are adjustable to and from the base 6 in slots located in the supporting brackets 14. Minute adjustment of the contact-tails 11 and 12, in relation to contacts 18 and 19, is obtained by adjusting the screw, 22, which passes through elements, 1, 11, 12, and springs 23. Springs, 23, tend to force the tails, 11 and 12 apart. On the upper end of support-plate 4 there is an internally threaded boss, 24, which supports the screw, 25, and upon the end of which is mounted the knurled wheel, 26; this screw and wheel are used to adjust element 1 in relation to the position of the cups 16 and 17, or the contacts 18 and 19 which they contain.

Plate, 27, takes the end thrust of screw 25, plate, 28, is packing beneath support plate 4, and plate 4 is arranged to be in tension toward base 6 in opposition to the pulling action of screw 25. Wheel, 26, is arbitrarily graduated to indicate the amount of adjustment of element 1. 29, is a pointer to indicate the amount of movement of wheel 26. The dotted lines, 30, indicate the position of the thermostat cover which is not drawn in; on the face of this cover the words, "More heat" and "Less heat" with the arrows, as indicated at 31 and 36, will be embossed, or printed, and are intended as a guide to definite adjustment of element 1 by means of wheel 26. Push-button switches, 37, are for remote manual control of the apparatus which the thermostat automatically operates, and snap switch, 39, is used to disconnect the thermostat from the electric circuits when manual control is being effected by switches 37. Switch, 35, any number and type of which may be used, is to control auxiliary apparatus which is used in conjunction with the main apparatus which the thermostat operates; these switches may be mounted on the thermostat base 6, and be electrically fed from the mains of the thermostat circuit; for example, a light can be connected in series with element 1 to show that the main apparatus is in motion, it will stay lighted as long as element 1, is making contact with one of the other contacts; switch 35 will disconnect this light when desired.

This thermostat may be used to operate valves, alarms, signaling devices, draft and ventilating apparatus, machines etc., automatically, which require large electric current and voltage and without the aid of electric relays or stepping up devices.

The thermostat is located on two open electric circuits made up of wire, 32, attached to element 1, and wires, 33 and 34, attached to studs 20 of the cups 16 and 17.

When high temperatures affect the deflecting element 1, contact-tail, 11, engages with contact 18; current flows from the source through wire 32, elements 1, 11, 18, wire 33, the apparatus to be actuated and back to the source. When low temperature affects the deflecting element 1, contact-tail, 12, engages with contact 19; current flows from the source through wire 32, elements 1, 12, 19, wire 34, the apparatus to be actuated and back to the source; thus, completing the cycle. When the thermostat functions, the current may flow for an instant, or for an indefinite period, depending upon the type of apparatus to be operated, and the oil in the cups 16 and 17 dissipates the sparking and heat resulting therefrom. Manual control is effected by disconnecting the thermostat from the electric circuit by switch 39 and then operating manually the push-button switches 37 when desired. The base 6 will be inscribed as at 38.

I claim:

In a thermostat, the combination, with a deflecting element and a thermostat cover, of two contact tails fastened to the free end of the said deflecting element, set out of alignment in two directions for the purposes of adjusting and to prevent double contact, and adapted to make contact with and to transmit to other contacts relatively high electric current and voltage, alternately, and in oil, the said contact-tails to be tipped with metal that will prevent fusing of contacts when operated without oil, a compression spring between each contact-tail and the free end of the deflecting element adapted to force said contact-tails away from the deflecting element; an adjusting screw passing through said contact-tails, said springs and said deflecting elements adapted to draw all said parts together; two contacts, tipped with metal that will not fuse, when operated without oil, during the transmission of current from the said contact tails, and adapted to receive current from the said contact-tails, in oil; two cups adapted to carry oil and the said two contacts, internally, they having studs and nuts from their bottoms adapted to retain the said cups in position; two brackets adapted to fasten to the thermostat base and hold said cups in position; a plate adapted to support the said deflecting element, fastened at one end to the thermostat base and is acted upon at its free end; an internally threaded boss adapted to support the deflecting element's adjusting screw, said boss to be secured to the said support plate; a screw adapted to adjust the deflecting element; a graduated wheel mounted on said adjusting screw adapted to give readings of adjustment of said deflecting element; a pointer adapted to indicate the amount of said adjustment adapted to be secured to the said thermostat cover; a thrust plate beneath the point of said adjusting screw; a packing plate beneath the fastened end of the said support plate; a laminated, insulating, thermostat-base adapted to minimize distortion of itself and to carry the thermostat and its accessories, and connecting wires, substantially as set forth.

JOHN J. FAGAN.